(No Model.) 5 Sheets—Sheet 5.
C. L. FORTIER.
AUTOMATIC SPRINKLER SYSTEM.
No. 468,440. Patented Feb. 9, 1892.
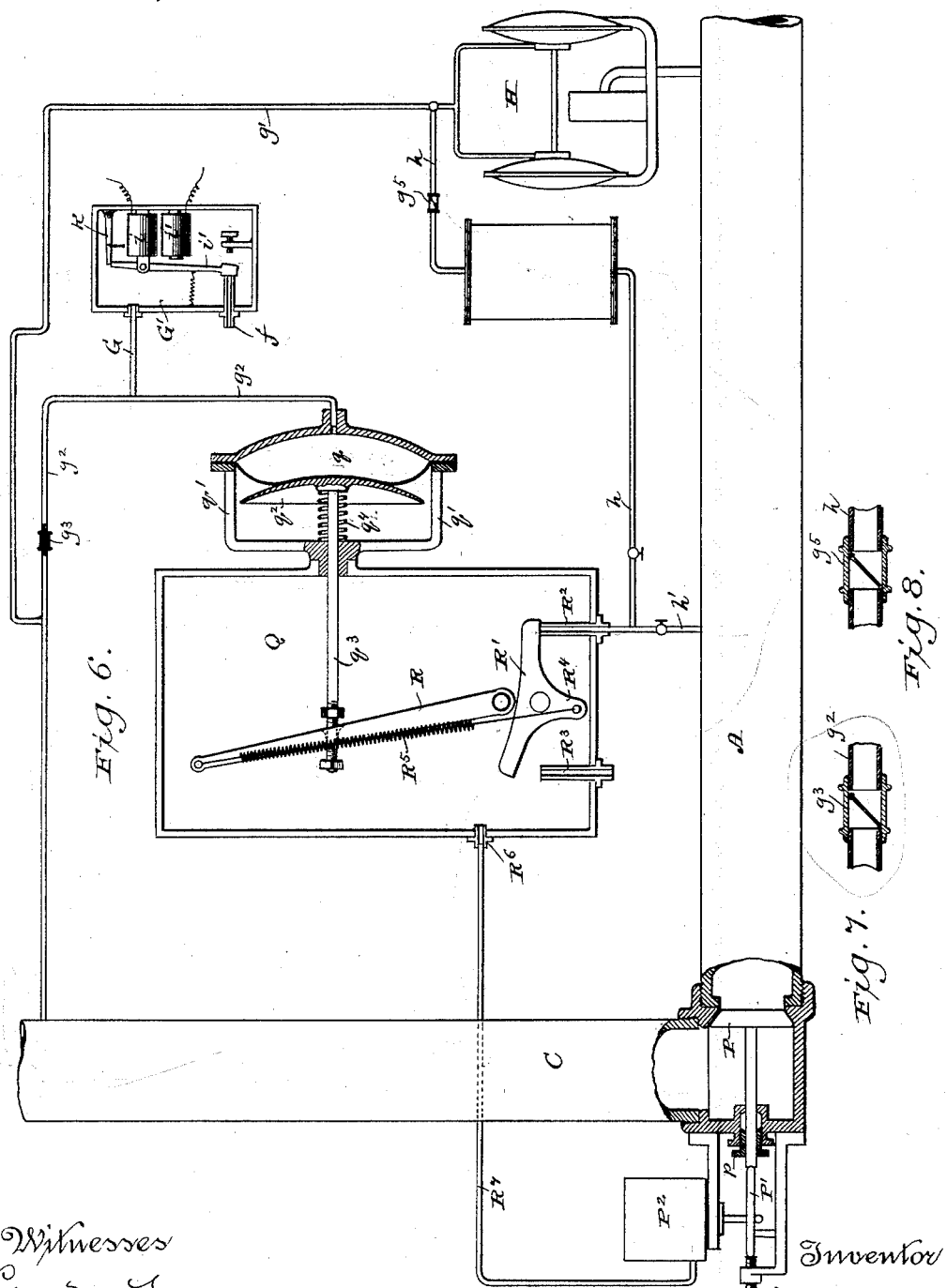

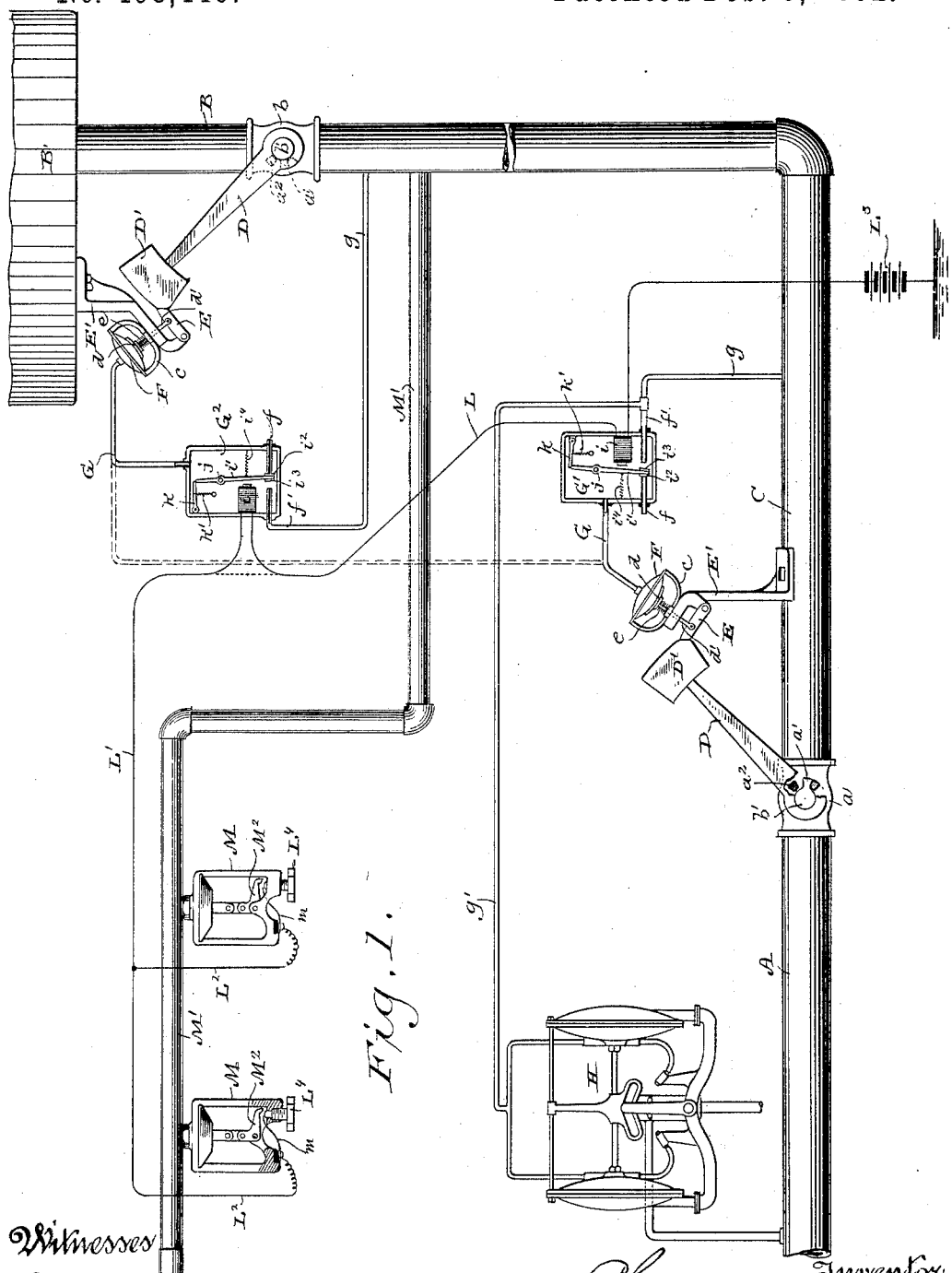

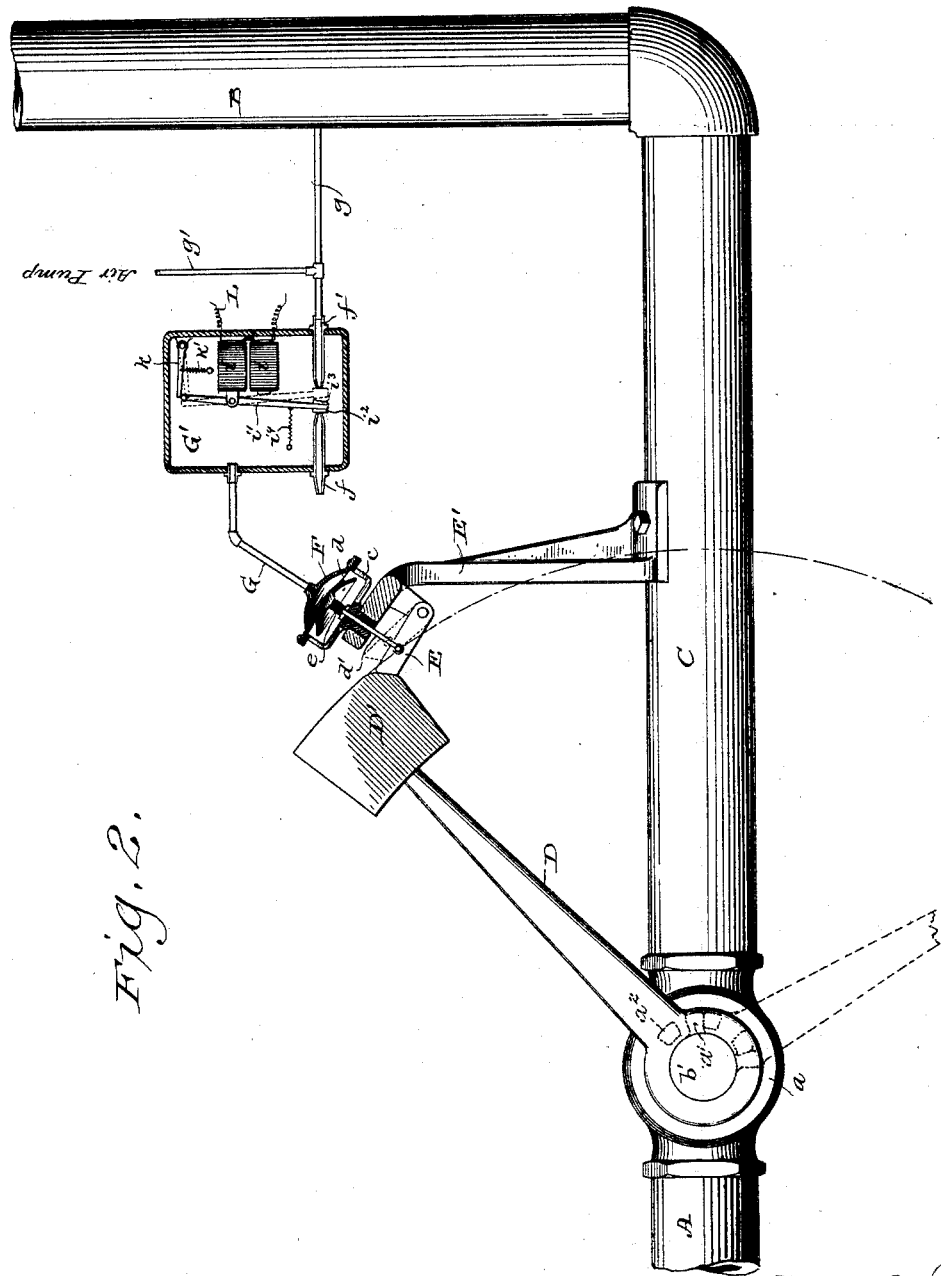

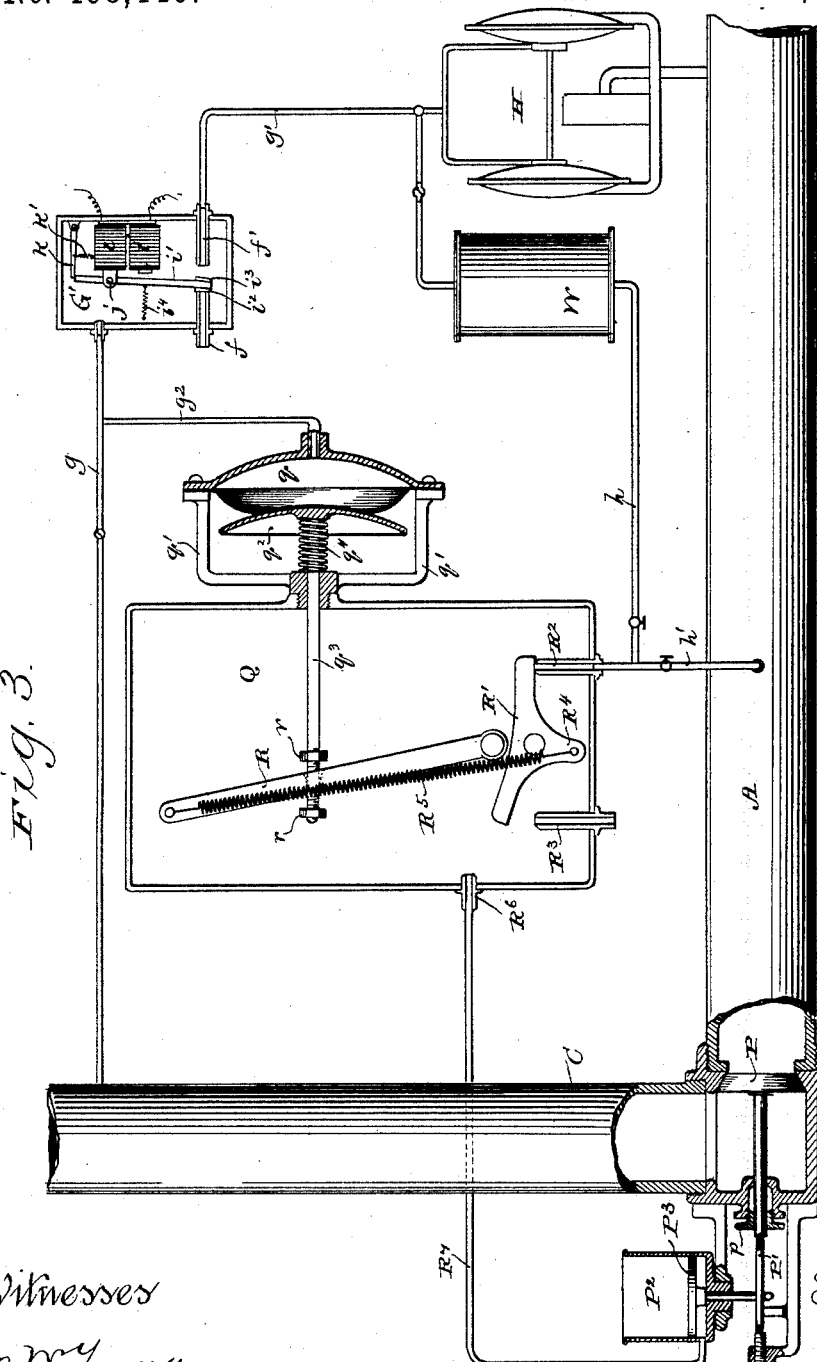

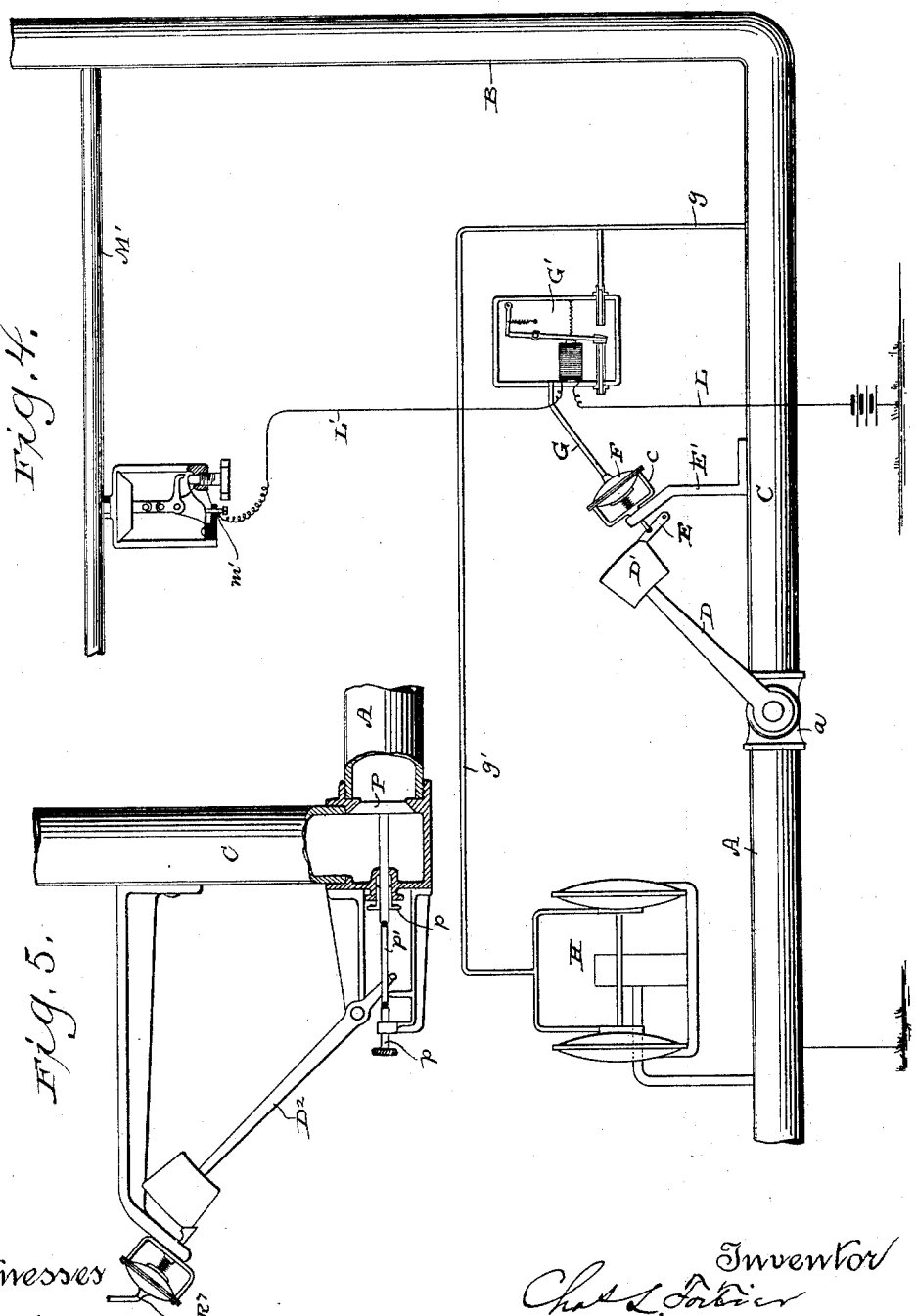

UNITED STATES PATENT OFFICE.

CHARLES L. FORTIER, OF MILWAUKEE, WISCONSIN, ASSIGNOR TO GEORGE KNOWLES, JR., OF SAME PLACE.

AUTOMATIC SPRINKLER SYSTEM.

SPECIFICATION forming part of Letters Patent No. 468,440, dated February 9, 1892.

Application filed March 29, 1889. Serial No. 305,231. (No model.)

*To all whom it may concern:*

Be it known that I, CHARLES L. FORTIER, of Milwaukee, in the county of Milwaukee, and in the State of Wisconsin, have invented certain new and useful Improvements in Automatic Sprinkler Systems; and I do hereby declare that the following is a full, clear, and exact description thereof.

This invention is of a kindred nature to that described in an application filed by me and bearing even date herewith and numbered 305,230, in which application I show and describe the sprinklers, sprinkler-pipe, and service-pipe, with a valve between the two pipes, an expansion-chamber having a movable wall, and a stem connecting the valve and movable wall, all of which is specifically claimed in said other application in combination with other elements not shown in this specification.

My invention relates to automatic sprinkler systems involving the use of air and electricity combined or separately, and will be fully described hereinafter.

In the drawings, Figure 1 is a diagram showing my system in one of its forms; and Fig. 2 is a detail, partly in section. Fig. 3 is a partly-sectional elevation of a modification; Fig. 4, another modification. Fig. 5 is a detail of modification, and Fig. 6 is a diagram of a further modification. Figs. 7 and 8 are detail sectional views of valves employed in my invention.

A is a pipe that is always open to one source of water-supply—the hydrant, for instance—and B is a pipe that leads from a tank or reservoir B'. The pipe A is normally closed by a valve $a$ and pipe B by a valve $b$. The section C of pipe between valves $a$ and $b$ is normally empty. The stem $b'$ of each of the valves $a$ and $b$ is formed with a lug $a'$, and one end of a lever D is slipped onto the stem $b'$ and fits loosely thereon, but is formed with a lug $a^2$, that when lever D falls to about a horizontal position will strike lug $a'$ and turn the stem $b'$, and thus open the valve. Each of the levers D is formed or provided with a head D' on its outer end that aids it in its descent, and one corner of this weight is beveled to receive a like beveled end of a trigger E, the other end of which is pivoted to a standard E', that projects up from pipe C or other support. This standard also supports a spider $c$, the arms of which support the rim of an expansion-chamber F. A plate $d$, from the under side of which a stem $d'$ projects down through the standard, is held up against the under side of the expansion-chamber by a spring $e$, that surrounds the stem $d$, its lower end bearing on the hub of the spider, and the lower end of stem $d'$ is pivoted to trigger E. A pipe G leads from expansion-chamber F to a valve-chamber G' or $G^2$, out of each of which two pipes $f$ and $f'$ lead, one $f$ to the open air and the other into pipe C through pipe $g$, and from an air-pump H by a pipe $g'$. These chambers G' and $G^2$ each contain an electro-magnet $i$, the armature $i'$ of which is pivoted to the sides of the chambers at $j$. On its lower end armature $i$ carries two valves or stoppers $i^2$ $i^3$. Normally the valve or stopper $i^2$ is held against the mouth of pipe $f$ by a spring $i^4$; but when magnet $i$ is energized it overcomes the force of the spring $i^4$ and causes valve or stopper $i^2$ to leave pipe $f$, and causes valve or stopper $i^3$ to close pipe $f'$, thus allowing the chamber F, which is normally expanded by air from pump H, to collapse as the air escapes from it through pipes G and $f$, and also permitting the spring $e$ to lift its stem $d'$, and with it the trigger E, that supports weight D'. After the armature $i'$ has been attracted to magnet $i$, its lower end is locked against the end of pipe $f'$ by a drop $k$, which is drawn down on the wedge-shaped portion of the armature by a spring $k'$, as shown in dotted lines, Fig. 2.

The apparatus just described is substantially duplicated in each system, and the magnets $i$ of the two chambers are connected by wires L L' $L^2$ with a battery $L^3$ and with a spring $m$, that lies in the path of a thermostat $L^4$, and sprinklers M, that depend from a pipe M', that in turn lead from pipe C, are operated each by a thermostat in case of a rise of temperature, first making contact with the spring $m$, which is insulated from the pipes to send in an alarm by completing circuit from the battery through the piping and magnets to ground.

When desirable, one electro-magnet and valve-chamber only may be used for dropping both levers D, as shown in dotted lines in Fig. 1, and in case the valve-chamber G² is omitted the pipes G G will be joined directly to each other, as will be the wires L L'.

In the modification, Fig. 3, I use a piston-valve P for closing a pipe A at its junction with pipe C, the stem of which valve passes out through a stuffing-box $p$, where it is concaved to receive one end of a link P', the other end of which receives a set-screw $p'$, which, acting through the link, locks the valve tightly in its seat. Just above the link P' is located a cylinder P², in which a piston P³ works, and the lower end of the stem of this piston is bent at right angles under the link P', so that when the piston rises its stem will lift the link from between the stem of valve P and the set-screw to permit the pressure in pipe A to open the valve and allow the water from pipe A to enter pipe C. The piston P³ is raised by the pressure of air from a pump H, which air is admitted to it and exhausted from just as the air is admitted to and exhausted from expansion-chamber F, or the piston P³ may be operated by either air or water, as shown in Fig. 3, in which G' is a valve-chamber, such as before described, which is connected by a pipe $g'$ with the air-pump and another pipe $g$ with the empty pipe-section C, and $q$ is an expansion-chamber that is connected with pipe $g$ by a pipe $g^2$. This chamber is supported by a spider $q'$ and a head $q^2$, having a stem $q^3$, that projects through the base of the spider into a valve-chamber Q, and is held out against one wall of expansion-chamber by a spring $q^4$. The end of stem $q^3$ that projects into chamber Q is formed or provided with two lugs $r$ $r$, which between them loosely embrace a lever R, the lower end of which is pivoted to the valve-chamber, and just beneath the pivot of lever R a rocking bar R' is pivoted. One arm of the bar R' overhangs a port R² and the other arm a port R³, while the third arm R⁴ depends from its center and is connected by a spring R⁵ with the extreme upper end of lever R, so that when the chamber $q$ is expanded the upper end of lever will be thrown so far back of its pivotal center that it will cause the rock-bar to close port R², and when the chamber $q$ is collapsed the spring $q^4$ will draw the upper end of lever R so far forward that the change in the direction of the draft of spring R⁵ will cause the rock-bar to open port R² and close port R³. The port R³ leads to the open air, while port R² leads from the air-pump H by pipe $h$ and from the pipe A by a pipe $h'$. Another port R⁶ leads through a pipe R⁷ to the cylinder P² beneath its piston.

The modifications in Figs. 4 and 5 show my device in use with a closed circuit. The valve-chamber G' is constructed and connected just as the valve-chamber G' is in Fig. 2, except that the position of magnet $i$ is changed so as to cause the armature to normally close pipe $f$ by the attraction of the magnet instead of by the spring $i^4$. The contact-spring $m$ of each sprinkler-frame M in Fig. 4 is insulated from the frame, as in Fig. 1; but, unlike the spring $m$ in Fig. 1, it is in constant contact with the thermostat, and an insulated contact-post $m'$ projects up against its under side and normally makes contact with it, and this post is connected by a wire L² with the magnet $i$, making a circuit, as in Fig. 1, through the magnet to battery, thus energizing the magnet and causing its armature to close valve $i^2$ and hold it closed until a rise of temperature causes the thermostat to lift the spring $m$ out of contact with post $m'$, when the magnet will be de-energized and the armature-lever will be drawn away from pipe $f$ and onto $f'$ by spring $i^4$.

In the modification shown in Fig. 5 a piston-valve P is used as well as a link P' and set-screw $p'$; but a lever D² is substituted for the stem of piston P³, and this lever is normally supported by a trigger F', that is controlled by an expansion-chamber F².

The operation of my device is as follows: Taking my device as shown in Fig. 1, the pipes A and B contain water under pressure. The pipes C and M' are empty, except that they contain air under pressure. The sprinklers M depend upon the pipes M', and each of the sprinklers contains a valve that is opened by the thermostat as it expands up against a toggle-dog M² under the influence of heat. The pressure of air in the pipes, acting on the expansion-chambers F, causes them to hold the triggers E in position to support the valve-levers D. Now suppose a fire occurs, a thermostat L⁴ expanding will make contact with wire $m$ and make circuit that energizes magnets $i$. These attracting their armatures cause them to open pipes $f$ and close $f'$, thus shutting off the air from pipe C and at the same time allowing the springs $e$ to collapse expansion-chamber F and lift the triggers E, so as to permit the levers D to drop and open the valves, when the water will enter pipes C and M' and thus get to the sprinklers, which have been opened by the thermostat, and flood the room.

In the modification in Fig. 3 when the weighted levers are not used the operation is as follows: Upon the energizing of magnet $i$ the port $f$ is opened and $f'$ closed. This allows chamber $q$ to collapse and causes its stem $q^3$ to operate rock-bar R', which closes R³ and opens R², allowing air from pump $h$ to pass through chamber Q and operate piston P³ to open valve P, or, instead of air, water may be admitted from pipe A through $h$ to chamber Q.

In Fig. 6 the chamber G' has no port $f'$ and the air from pipe $g'$ gets to pipe G through a pipe $g^2$, and this pipe supplies chamber Q. A valve $g^3$ is placed in pipe $g^2$, which valve is hung to its seat at its top and is inclined, as shown in Fig. 7, so as to permit air to flow freely from chamber $q$ through it; but it is also perforated to permit a retarded backward flow of air through it. A valve $g^5$ is also placed in pipe $h$ to prevent a backward flow of air from reservoir in pipe $h$.

This device has about the same operation as that in Fig. 3, and in all of the modifications the sprinklers are capable of operation by either electricity or air or water pressure, for as soon as a single sprinkler is opened by a thermostat the escape of air through it will permit the expansion-chambers to collapse and thus open the valves to let water into pipes C and M'.

Having thus fully described my invention, what I claim as new, and desire to secure by Letters Patent, is—

1. The combination, in a sprinkler system, of a valve interposed between the main and sprinkler pipes, an expansion-chamber and connections between the movable wall thereof and the valve-stem, and an intermediate valve-chamber tapping the connection between the fluid-supply and sprinkler-pipes and having one port leading to the open air and another to the expansion-chamber, with a swinging valve, a thermostatic sprinkler, and connections between said sprinkler and valve for operating the latter through the action of the thermostat, as set forth.

2. The combination, in a sprinkler system, of a valve interposed between the main and sprinkler pipes, a stop for securing said valve in its closed position, and an expansion-chamber and connections between its movable wall and said stop, a valve-chamber interposed in the connection between said expansion-chamber and its fluid-supply and having an exhaust-port, a double valve adapted for alternately closing the port that leads from the fluid-supply to the valve-chamber and opening the exhaust-port, and vice versa, thermostatic sprinklers and an intermediate expansion-chamber connected therewith, and connections between the movable wall of the last-named expansion-chamber and the double valve for operating the said valve through the action of the sprinklers, substantially as described.

3. The combination, in a sprinkler system, of a valve interposed between the main and sprinkler pipes, its lever and a trigger for supporting it to keep the valve closed when the chamber is expanded, a valve-chamber arranged between the expansion-chamber and fluid-supply, a double valve arranged in said valve-chamber for controlling the supply and exhaust of fluid in the expansion-chamber, and an electro-magnet and thermostat in circuit for operating the double valve to release the air from the expansion-chamber, as set forth.

4. The combination, in a sprinkler system, of a valve and its stem, an expansion-chamber, a stop connected with the latter for controlling the valve, a valve-chamber interposed between the expansion-chamber and the fluid-supply and having a port leading to the outer air, valves arranged therein for controlling the admission of air to or from the valve-chamber, an expansion-chamber and connections between its movable wall and the last-named valves, and an electric valve interposed between the expansion-chamber, its fluid-supply, and sprinkler-pipe, as set forth.

5. The combination, in a sprinkler system, of a valve for controlling the supply of water to the sprinklers, a stop for securing said valve in its closed position, and an expansion-chamber the movable wall of which is connected with said stop, a valve-chamber interposed between the sprinkler-pipe and fluid-supply, an intermediate expansion-chamber, a double valve arranged in the valve-chamber, and connections between the movable wall of the expansion-chamber and the double valve, a port leading from the fluid-supply into the valve-chamber and another from the outside, and still another port, and connections from that to the first-named expansion-chamber, substantially as described.

In testimony that I claim the foregoing I have hereunto set my hand, at Milwaukee, in the county of Milwaukee and State of Wisconsin, in the presence of two witnesses.

CHARLES L. FORTIER.

Witnesses:
S. S. STOUT,
WILLIAM KLUG.